United States Patent [19]
Lauro

[11] Patent Number: 5,509,172
[45] Date of Patent: Apr. 23, 1996

[54] SUPPORT ASSEMBLY FOR MOUNTING CASTERS TO A FRAME OF A STROLLER

[75] Inventor: Charles W. Lauro, Southern Pines, N.C.

[73] Assignee: Kolcraft Enterprises, Inc., Chicago, Ill.

[21] Appl. No.: 225,832

[22] Filed: Apr. 12, 1994

[51] Int. Cl.$^6$ .................................................. B60B 33/02
[52] U.S. Cl. .................................................. 16/30; 16/35 R
[58] Field of Search .............................. 16/29, 30, 31 R, 16/35 R, 44

[56] References Cited

U.S. PATENT DOCUMENTS

| | | | |
|---|---|---|---|
| 314,961 | 3/1885 | Mendenhall | 16/4 |
| 1,232,688 | 7/1917 | Johnson. | |
| 2,847,696 | 8/1958 | Kramcsak. | |
| 3,337,230 | 8/1967 | Golding. | |
| 3,758,917 | 9/1973 | Schroer | 16/36 |
| 4,078,817 | 3/1978 | Ferguson et al. | 280/242 |
| 4,219,904 | 9/1980 | Melara | 16/47 |
| 4,290,166 | 9/1981 | Melara | 16/47 |
| 4,491,335 | 1/1985 | Evron | 280/47.41 |
| 4,608,729 | 9/1986 | Huang | 16/35 R |
| 4,649,596 | 3/1987 | Kassai | 16/35 R |
| 4,731,899 | 3/1988 | Huang | 16/35 R |
| 4,759,098 | 7/1988 | Ko | 16/29 |
| 4,847,945 | 7/1989 | Schwartz et al. | 16/29 |
| 4,854,008 | 8/1989 | Kuo | 16/30 |
| 4,897,895 | 2/1990 | Wang | 16/20 |
| 4,913,452 | 4/1990 | Zun | 280/47.41 |
| 4,969,230 | 11/1990 | Huang | 16/30 |
| 5,199,534 | 4/1993 | Goff | 16/35 R |
| 5,237,721 | 8/1993 | Andrisin, III | 16/29 |
| 5,276,941 | 1/1994 | Chen | 16/47 |

FOREIGN PATENT DOCUMENTS

| | | | |
|---|---|---|---|
| 2614862 | 5/1987 | France. | |
| 2644745 | 3/1989 | France. | |
| 2131289 | 6/1984 | United Kingdom. | |
| 2168891 | 7/1986 | United Kingdom | 16/35 R |

Primary Examiner—Mark Rosenbaum
Assistant Examiner—Kenneth J. Hansen
Attorney, Agent, or Firm—Marshall, O'Toole, Gerstein, Murray & Borun

[57] ABSTRACT

A support assembly is provided for mounting a wheel to a frame member. The assembly includes a sleeve for telescopingly receiving a frame member, a collar for telescopingly receiving the sleeve, a housing for separable connection to the collar and for mounting to a wheel axle, and a locking member on the housing for engaging a recess in the sleeve in order to couple the housing to the sleeve.

14 Claims, 2 Drawing Sheets

SUPPORT ASSEMBLY FOR MOUNTING CASTERS TO A FRAME OF A STROLLER

BACKGROUND OF THE INVENTION

1. Field of the Invention

The present invention relates generally to a support assembly for mounting wheels or casters to a frame member of a stroller and it relates, more particularly, to a support assembly which can readily be installed and removed without the need for tools and which can be interchangeably employed on either the front wheels or the rear wheels of a stroller and, further, is structured to accommodate a wheel brake when employed on either a front or rear wheel.

2. Description of the Prior Art

A common child stroller has a tubular frame structure with four legs extending downwardly from a seat arrangement. Each of the legs is fitted at its distal end with a support assembly for mounting wheels or casters. The mounting of the wheels or casters is such that the two forward support assemblies swivel and the rear support assemblies are positioned in fixed alignment. This construction has been found to enable satisfactory steering capability for the stroller.

A form of support assembly for mounting casters to a stroller frame member is disclosed in Chen, U.S. Pat. No. 5,276,941. As shown therein, a first sleeve is secured to a tubular frame segment extending from the main chassis of the stroller by a rivet. A second sleeve slides over the first sleeve. The second sleeve includes a cap-like element which contains a spring. The spring biases or cushions an axle extending through the cap-like element which, in turn, supports a pair of casters. The second sleeve is provided with a flexible tab or buckle arrangement which is structured for interconnection with a lower flange on the first sleeve to provide removable, swiveling engagement of the second sleeve with the first sleeve and enables removal of the second sleeve with the casters from the frame member. Thus, a swivelable, disconnectable mounting arrangement is provided for the casters making the stroller steerable.

While the foregoing mounting arrangement is acceptable from the standpoint of providing a removable caster support assembly, this arrangement is structured to function only in a swivelable manner and is not capable of being fixedly mounted. In this connection, it is desirable to provide a mounting assembly which is not only easy to install and remove, but an assembly which can be used interchangeably for either the front or rear casters of a stroller. Typically, the rear casters are not arranged to swivel. Clearly, the interchangeability of the mounting assemblies of the present invention from front to rear casters results in lower stocking and production costs which will reduce the cost of a stroller.

SUMMARY OF THE INVENTION

The present invention is an improvement over the prior art in that a caster mounting assembly is provided which may be used interchangeably for either the front, swiveling wheels or the rear, fixed wheels of a stroller. The present assembly comprises a sleeve adapted to telescopingly receive a tubular frame member of a stroller; a collar adapted to telescope over the sleeve; a spring housing containing a spring, and preferably, a leaf spring, which cushions an axle interconnected therewith. The spring housing is connected by a pivot pin to the collar and a flexible tab positioned on the collar engages with the housing to lock the housing to the collar. In a preferred embodiment, the spring housing is also formed with a connecting aperture or "dog" for attachment of the assembly to a suitable known brake lever, if a braking assembly is desired. The housing further is formed with a pin projection which extends through the collar when the housing is in its mounted condition pivoted into engagement with the collar and locked in place by the flexible tab on the collar. The pin is received by an annular groove in the sleeve. Thereby, the collar, housing and caster assembly is mounted for swiveling movement to the sleeve. When it is desired to alternatively mount the assembly for fixed, non-swiveling motion relative to the stroller frame, a sleeve having simply an aperture is substituted for the sleeve having an annular groove. The pin projection of the housing in this construction engages the aperture, thereby locking the collar and the associated caster assembly to the sleeve.

BRIEF DESCRIPTION OF THE DRAWINGS

The foregoing features and advantages of the invention will become apparent from the following detailed description taken in connection with the accompanying drawings wherein.

DETAILED DESCRIPTION OF THE PREFERRED EMBODIMENT

Figure 1:
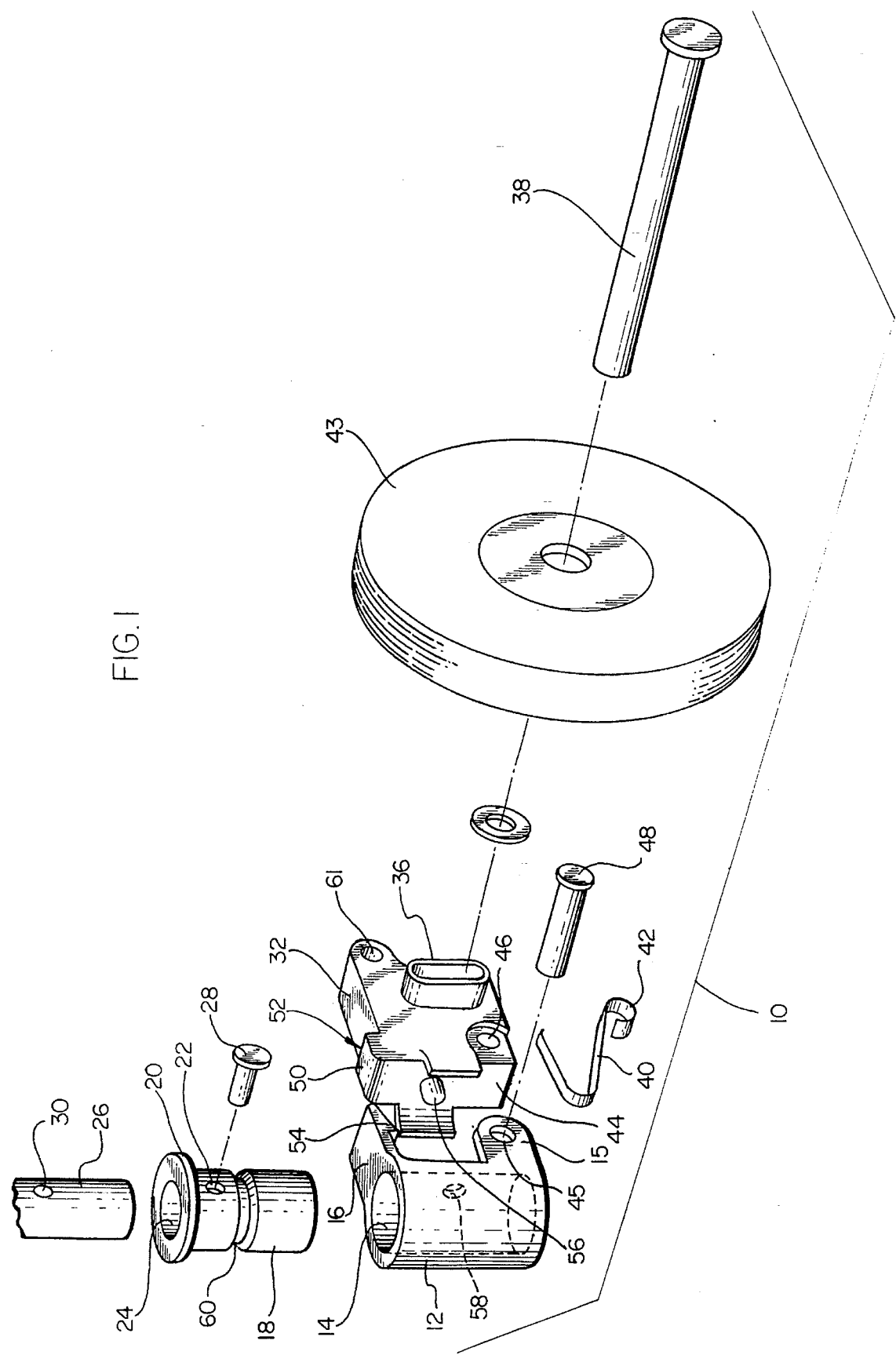
FIG. 1 is an exploded perspective view of a support assembly for mounting casters to a frame of a stroller in accordance with the invention.
Figure 2:
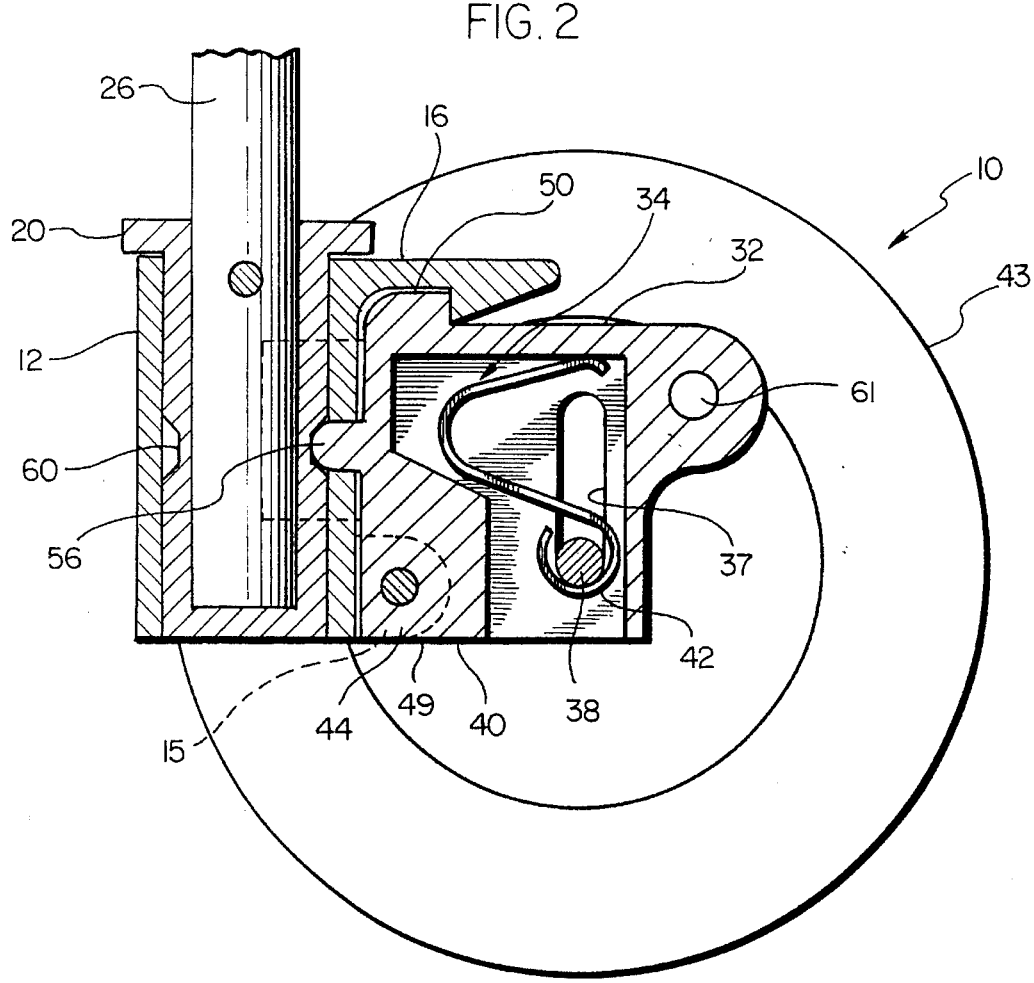
FIG. 2 is a side cross-sectional view thereof.

Referring now to the drawings and initially to FIGS. 1 and 2, a support assembly for mounting casters to a frame of a stroller is designated generally by the reference numeral 10. The support assembly 10 includes a collar 12 having a smooth axial bore 14. The collar 12 is further provided with a pair of spaced laterally extending ears 15 (only one of which can be seen) and with an integrally-formed tab 16, the purpose of which will be described in detail hereinafter.

Slideably receivable within the bore 14 of the collar 12 is a sleeve 18 have an upper annular flange 20 and an aperture 22. The sleeve 18 is provided with a smooth axial bore 24 which is adapted to telescopingly receive a tubular frame member 26 of a stroller (not shown). The sleeve 18 is securable to the frame member 26 by a suitable pin 28 which extends through aperture 22 and into an aperture 30 of the frame member 26.

As best seen in FIG. 2, the assembly 10 further includes a housing 32 which is formed with an irregular recess 34. Extending outwardly from each side of the housing 32 is a rectilinear projection 36 which defines a pair of opposed vertical slots 37. The slots 37 are configured to receive an axle 38 and to permit the axle to displace up and down in the slots 37 while journalling the axle 38 for rotation. Within the recess 34 is a leaf spring 40 having a turned end 42 through which the axle 38 passes. The axle 38 is thereby biased downwardly providing a self-adjusting or self-leveling or cushioning feature for a pair of casters 43 (only one of which can be seen).

In accordance with the invention, the housing 32 is provided with a tongue portion 44 configured so as to be snugly received within the space defined by the two ears 15. Ears 15 have apertures 45 and the tongue portion 44 is formed with a through bore 46 such that a pin 48 may connect the collar 12 to the housing 32 at a pivot joint 49.

The housing 32, when connected to the collar 12 is thereby pivotable upwardly or downwardly in a vertical plane relative to the collar 12. The housing 32 is further provided with a ramp portion 50 defining a bearing surface 52. The tab 16 is also provided at its distal end with a ramp portion 54 which cooperates with the ramp portion 50 of the housing 32 to form a latch arrangement. As best seen in FIG. 2, when the housing 32 is assembled or mounted to the collar 12, the tab 16 and bearing surface 52 cooperate to securely, but removably connect the housing 32 and collar 12. In order to secure the collar 12, the housing 32 and the associated caster assembly to the frame member 26 of a stroller, the housing is provided with a integrally-formed pin 56 extending forwardly (as viewed in FIG. 1) The pin 56 is so configured and dimensioned as to pass through an aperture 58 formed in the collar 12 and to engage an annular groove 60 formed in the sleeve 18. It can thus be seen that when the sleeve 18 is fixed to the frame member 26 and the collar 12 is placed over the sleeve 18, the pin 56 will cooperate with groove 60 to permit full 360 degree axial rotation of the collar 12 relative to the frame member while at the same time holding the collar 12 to the sleeve 18. By this arrangement, a swivelable caster assembly is provided.

In a most preferred embodiment of this invention, a connecting aperture or dog 61 is formed on the surface of the housing 32 in a manner such that a pin (not shown) extending therethrough may be employed to engage with a known brake lever assembly.

Figure 3:
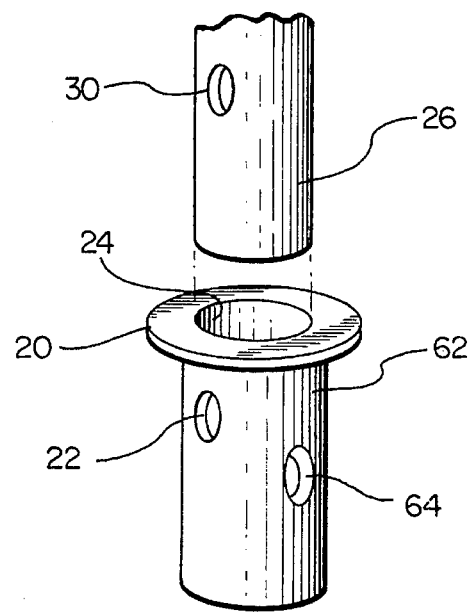
FIG. 3 is a perspective view of an alternative sleeve useable with the assembly of FIGS. 1 and 2.

Turning now to FIG. 3 a sleeve 62 is illustrated for connection to a frame member 26. This sleeve 62 is identical to sleeve 18 but does not have an annular groove 60. Instead, sleeve 62 is simply provided with an aperture 64. In accordance with a feature of the invention, when it is desired to have a fixed caster assembly such as for the rear wheels of a stroller, the sleeve 62 may be installed on the frame member 26 instead of the sleeve 18. In such event, the pin 56 will cooperate with aperture 64 to lock the collar 12 to the sleeve 62 preventing both axial and rotational movement of the collar 12 relative thereto.

It can now be appreciated that a support assembly 10 of the present invention provides a means for mounting casters 43 which is highly effective and easy to assemble without tools. This allows the assembly 10 to be economically packaged and shipped to the consumer without factory assembly time. Yet assembly can be readily performed by the consumer without difficulty or annoyance. Moreover, the pivotable housing 32 and integrally formed pin 56 arrangement permits the assembly 10 to function both as a swivelling and fixed caster assembly by simply substituting one sleeve 18 or 62 for the other sleeve 18 or 62. This feature makes the support assembly 10 highly economical to manufacture with resulting cost savings to the consumer.

While the present invention has been described in connection with particular embodiment thereof, it will be understood by those skilled in the art that many changes may be made without departing from the true spirit and scope of the present invention.

What is claimed is:

1. A support assembly for mounting a wheel to a tubular frame member comprising:

a sleeve having a recess located in a periphery thereof, said sleeve being adapted to telescopingly receive a tubular frame member;

a collar having an opening therein and adapted to telescoping receive said sleeve, said opening and said recess being substantially aligned when said sleeve is received in said collar;

a housing separably connected to said collar, said housing including means for mounting said assembly to a wheel axle;

a locking member integral with and extending out from said housing, said locking member being adapted to be removably inserted through said collar opening and engageable with said sleeve recess to releasably couple said housing to said sleeve; and, latch means extending from one of said collar and said housing for releasably latching said housing to said collar, whereby upon disconnecting said latch means, said locking member disengages from said sleeve recess and said collar opening.

2. The support assembly of claim 1 wherein said recess in said sleeve is an annular groove.

3. The support assembly of claim 1 wherein said recess in said sleeve is an aperture.

4. The support assembly of claim 1 wherein said housing includes a latching tab for said separable connection of said housing to said collar.

5. The support assembly of claim 1 wherein said locking member is a pin formed on said housing.

6. The support assembly of claim 1 wherein said housing includes a pivot pin for pivotally connecting said housing to said collar.

7. The support assembly of claim 1 wherein said housing is structured and dimensioned to contain a spring and said spring is engagable with said wheel axle to resiliently support a wheel.

8. The support assembly of claim 7 wherein said spring is a leaf spring.

9. The support assembly of claim 1 further including a connecting aperture on said housing for interconnection with a wheel brake.

10. The support assembly of claim 1 including a flexible latch member on said collar for engagement with said housing to lock the housing to the collar.

11. A support assembly for mounting a wheel to a tubular frame, said assembly comprising:

a tubular sleeve having a recess located in a periphery thereof, said sleeve being adapted to telescopingly receive a tubular shaft;

a collar having an opening therein adapted to telescopingly receive said sleeve;

a housing having a locking member joined thereto for coupling said housing to said sleeve, said housing including a pivot means for pivotally connecting said collar and housing;

a latch means for releasably locking said housing to said collar whereby when said latch means is in a locked position, said housing locking member extends through said collar opening and engages said sleeve recess;

said locking member comprises a pin adapted to be removably inserted through said collar opening which is substantially aligned with said recess and engage said recess; and, said latch means include a tab member extending from one of said collar and said housing and being adapted to releasably connect to one of said collar and housing whereby upon disconnecting said latch means, said locking pin disengages from said sleeve and said collar opening such that said housing and collar are removable from said sleeve.

12. A support assembly in accordance with claim 11 wherein said recess is a groove whereby when said locking member engages said groove, said assembly is adapted to swivel about said frame.

13. A support assembly in accordance with claim 11 wherein said recess is an aperture whereby when said locking member engages said aperture said assembly is fixed in a non-swivelable position on said frame.

14. A support assembly in accordance with claim 11 wherein said housing includes a leaf spring adapted to engage a wheel axle to resiliently support a wheel connected to said housing.

* * * * *

UNITED STATES PATENT AND TRADEMARK OFFICE
CERTIFICATE OF CORRECTION

PATENT NO. : 5,509,172
DATED : April 23, 1996
INVENTOR(S) : CHARLES W. LAURO

It is certified that error appears in the above-identified patent and that said Letters Patent is hereby corrected as shown below:

In col. 4, lines 1-2, delete "telescoping" and insert --telescopingly-- therefor.

Signed and Sealed this

Tenth Day of September, 1996

Attest:

BRUCE LEHMAN

*Attesting Officer*     *Commissioner of Patents and Trademarks*